C. LE G. FORTESCUE.
LOAD BALANCING SYSTEM.
APPLICATION FILED OCT. 6, 1916.
1,289,430.
Patented Dec. 31, 1918.
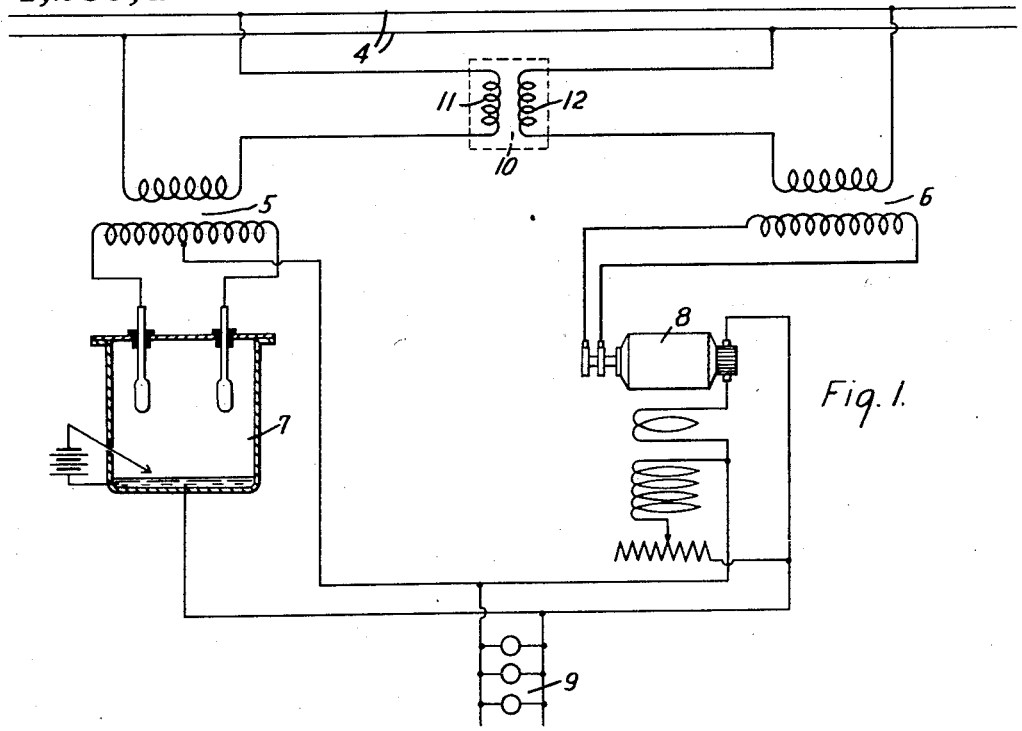
Fig. 1.
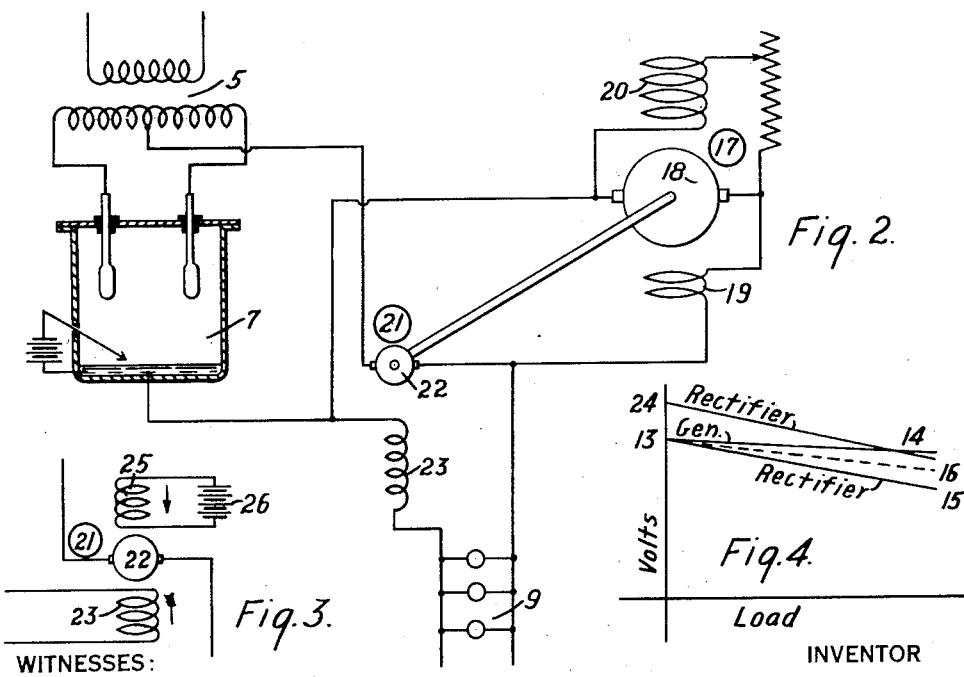
Fig. 2.
Fig. 3.
Fig. 4.
WITNESSES:
Fred. A. Lind.
D. C. Davis.
INVENTOR
Charles LeG. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

LOAD-BALANCING SYSTEM.

1,289,430.  Specification of Letters Patent.  Patented Dec. 31, 1918.

Application filed October 6, 1916. Serial No. 124,052.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Load-Balancing Systems, of which the following is a specification.

My invention relates to systems of electrical distribution wherein vapor converters are operated in parallel with dynamo-electric machines, and it has for its object to provide a system of the character designated wherein the total load supplied by said two direct-current sources may be divided therebetween in accordance with a predetermined ratio throughout the wide variations in said total load.

In the accompanying drawing, Figure 1 is a diagrammatic view of a vapor converter, together with attendant apparatus, connected to operate in parallel with a rotary converter, supplying current to a common load, and embodying a preferred form of my invention; Figs. 2 and 3 are diagrammatic views of modifications of the system shown in Fig. 1, said modifications embodying a generator operating in parallel with a vapor converter; and Fig. 4 is a diagram illustrating the action of a load-balancing device in adjusting the load distribution in accordance with my invention.

At the present time, improvements have been made in vapor-electric apparatus, such, for example, as the well known mercury-arc rectifier, so that it is now possible to construct and operate such apparatus of far greater capacity than it was possible to do until comparatively recently. When such large-capacity apparatus is used, it becomes desirable, at times, to operate an electric generator or generators, in conjunction or in parallel with it for feeding a common load, the apparatus and the generators being connected in parallel so that each may supply a portion of the load. Such operation is, in general, similar to the operation of two or more electric generators connected in parallel. It is a well-known fact, however, that vapor-electric apparatus fed from an alternating-current system does not regulate so closely as an electric generator, and, furthermore, when operating in parallel with such a generator, it tends to deliver a constant current. When such apparatus, therefore, is operated in parallel with an electric generator for supplying a common load, as the common load decreases, the load on the vapor apparatus will not decrease at the rate the generator current decreases and will thus supply more than its proportion of it, and, as the load further decreases, it may supply energy to the generator which will then operate as a motor. It thus becomes difficult to operate such apparatus in parallel with the electric generator.

When the generator is a compound-wound machine or a rotary converter, such parallel operation becomes practically impossible. This arises from the fact that, when the motoring action mentioned above occurs, the series field of the generator or rotary converter will oppose the shunt field, and, as a result, the converter or generator may attain a dangerously high speed, as it will be operating with substantially no field. In any case, there will be a short circuit which will shut down the system.

For an increase of load, the generator will maintain its voltage substantially constant for whatever value it may have been designed, whereas the voltage of the vapor electric apparatus will decrease. The generator will, therefore, supply more and more of the common load, inasmuch as its voltage will remain a substantially predetermined quantity, whereas the voltage of the vapor-electric apparatus will continually tend to decrease and the current will remain constant, irrespective of the common load.

In accordance with my invention, I provide booster means, either alternating or direct-current in nature, and I so associate said booster means with the other elements of the system that a substantially uniform load distribution is obtained throughout wide load variations.

Referring to the drawing for a more detailed understanding of my invention, I show a pair of alternating-current supply mains at 4 in Fig. 1. Two transformers 5 and 6 are so connected that their respective primary windings derive energy from the mains 4. The secondary winding of the transformer 5 is connected to supply energy to a vapor converter 7 of any desired form and, in like manner, the secondary winding of the transformer 6 is connected to supply energy to the alternating-current end of a compound-wound rotary converter 8. The direct-current output leads of the converter system and of the rotary-converter system are connected in parallel to supply direct current to a common load, indicated at 9.

In order to regulate the load distribution between two direct-current sources, I provide a booster transformer shown at 10. The winding 11 of said booster transformer is inserted in one of the supply leads of the transformer 5 and, in like manner, the winding 12 of the booster transformer 10 is inserted in one of the supply leads of the transformer 6.

The operation of the system described is as follows: the load-voltage characteristic of the rotary converter 8 may be plotted as a line 13—14 in Fig. 4 and, in like manner, the characteristic of the vapor converter 7 may be plotted as a line 13—15, dropping much more rapidly than the rotary converter characteristic. If it be desired that the two direct-current sources divide the load equally at light loads, the voltages are so adjusted that the characteristics 13—14 and 13—15 intersect near the axis of ordinates. At light load, the energization of the windings 11 and 12 of the booster transformer is very small and said transformer therefore produces but little effect on the system. At heavy loads, however, the output voltage of the rotary converter would tend to be much higher than that of the vapor converter, as indicated by the rapid drop of the characteristic 13—15. Under heavy-load conditions, however, an electromotive force is induced in the winding 11 from the winding 12 in such direction as to boost the voltage supplied to the vapor converter 7, causing the converter characteristic to be raised to an intermediate position, indicated at 13—16 in Fig. 4. In like manner, a voltage is induced in the winding 12 from the winding 11 in such direction as to buck the voltage supplied to the transformer 6, whereupon the voltage supplied to the rotary converter 8 is lowered, causing the rotary converter characteristic 13—14 to drop to the position 13—16. Thus, the effect of the booster transformer 10, if properly designed and connected, is to cause a predetermined load distribution between the two direct-current sources under wide variations in the total load.

In the system shown in Fig. 2, a generator is operated in parallel with a vapor converter and it is therefore difficult to adjust or equalize the load distribution on the input sides of the two direct-current sources as is done in the system of Fig. 1. I, therefore, employ booster machines on the output sides of said sources for obtaining the desired effect. A vapor converter 7 is energized from a transformer 5, as before, and supplies energy to a load circuit 9. A compound-wound direct-current generator 17, comprising an armature 18, a series field winding 19 and a shunt field winding 20, is adapted to be driven by any suitable prime mover (not shown) and is connected to supply energy to the load circuit 9 in parallel with the vapor converter 7. A direct-current booster machine 21, comprising an armature 22 and a field winding 23, is mounted to be driven by any suitable means, as, for example, by mechanical connection to the generator 17 and has its armature connected in series with the vapor converter 7. The field winding 23 is connected to be energized in proportion to the total current supplied to the load 9, as, for example, by being connected in series with one of the load-supply leads.

The operation of the system of Fig. 2 is as follows. At light loads, the two direct-current sources may be adjusted to equally divide the load, as indicated by the characteristics 13—14 and 13—15, in Fig. 4. With increase of load, the booster machine 21 is so energized as to raise the voltage of the vapor converter 7, moving the characteristic thereof, for example, to the position 13—16. The torque required to drive the booster machine 21, at the same time, produces a slight lowering of the speed of the generator 17, causing the characteristic of the generator also to assume the position 13—16 so that the desired load division is obtained. If the generator 17 is driven by a constant-speed prime mover, such, for example, as a well governed steam-engine or a synchronous motor, the characteristic 13—14 retains its position and the characteristic 13—15 of the vapor converter is raised into coincidence therewith.

Another method of adjustment of the apparatus shown is to energize the rectifier 7 to produce a much higher voltage than the generator 17 at light loads, the characteristic of the vapor converter assuming a position 24—14 while the characteristic of the generator remains 13—14 as before. As indicated in Fig. 3, the booster machine 21 is differentially excited by a separately excited field winding 25 and by the field winding 23 so that it produces a large bucking electromotive force because of the preponderance of the separately excited field over the lightly excited field winding 23. Said bucking action reduces the voltage of the vapor converter 7, lowering the characteristic 24—14 to coincidence with the characteristic 13—14. At heavier loads, the neutralizing effect of the two field windings of the booster machine 21 is more nearly perfect, reducing the net field and the bucking effect of said machine until, at the point 14, no bucking effect whatsoever is produced.

While I have illustrated my invention in three of its preferred forms and have mentioned other possibilities, I do not desire to be restricted thereto but desire that only such limitations shall be placed thereupon as are

I claim as my invention:

1. The combination with a vapor converter system and a dynamo-electric machine connected to operate in parallel in supplying direct current to a common load, of booster means connected in series with one of said direct-current sources and excited in accordance with the total load current of the combination for regulating the load distribution between said two direct-current sources.

2. The combination with a vapor converter system and a dynamo-electric machine connected to operate in parallel in supplying direct current to a common load, said two direct-current sources being designed to divide said load in a predetermined ratio at light load, of a booster dynamo-electric machine connected in series with said converter system and arranged to modify the voltage thereof in accordance with the total load in order to maintain said predetermined ratio of load distribution.

3. The combination with a vapor converter system and a dynamo-electric machine connected to operate in parallel in supplying direct current to a common load, said two direct-current sources being designed to divide said load in a predetermined ratio at light load, of a booster dynamo-electric machine connected in series with said converter system and arranged to boost the voltage thereof at heavy load in order to maintain said predetermined ratio of load distribution, and means for causing the voltage produced by said booster machine to vary with the total load of said combination.

4. The combination with a vapor-converter system and a dynamo-electric machine connected to operate in parallel in supplying direct current to a common load, said two direct-current sources being designed to divide said load in a predetermined ratio at light load, of a booster dynamo-electric machine connected in series with said converter system and arranged to boost the voltage thereof at heavy load in order to maintain said predetermined ratio of load distribution, the field winding of said booster machine being connected to be energized in accordance with the total load on said two sources, whereby the voltage of said booster varies substantially in accordance with said total load.

In testimony whereof, I have hereunto subscribed my name this 29th day of Sept., 1916.

CHARLES LE G. FORTESCUE.